(12) United States Patent
Hasenoehrl

(10) Patent No.: US 10,429,806 B2
(45) Date of Patent: Oct. 1, 2019

(54) VOLATILE COMPOSITION DISPENSER HAVING A TEMPERATURE SENSOR TO REMOTELY CONTROL AN AIR HANDLING DEVICE

(71) Applicant: The Procter & Gamble Company, Cincinnati, OH (US)

(72) Inventor: Erik John Hasenoehrl, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 428 days.

(21) Appl. No.: 14/879,108

(22) Filed: Oct. 9, 2015

(65) Prior Publication Data
US 2017/0102159 A1   Apr. 13, 2017

(51) Int. Cl.
*G05D 23/00* (2006.01)
*G05B 15/02* (2006.01)
(Continued)

(52) U.S. Cl.
CPC .............. *G05B 15/02* (2013.01); *F24F 11/30* (2018.01); *H04M 1/72533* (2013.01); *H04W 4/70* (2018.02); *F24F 2110/10* (2018.01)

(58) Field of Classification Search
CPC .................................................. F24F 11/0012
(Continued)

(56) References Cited

U.S. PATENT DOCUMENTS 3,917,165 A * 11/1975 Cross ................. G05D 23/1904
236/46 R
5,924,597 A    7/1999 Lynn
(Continued)

FOREIGN PATENT DOCUMENTS

JP    H0399670 U    10/1991
JP    2003042518 A    2/2003
(Continued)

OTHER PUBLICATIONS

U.S. Appl. No. 14/879,110, filed Oct. 9, 2015, Hasenoehrl, et al.
(Continued)

*Primary Examiner* — Evral E Bodden
(74) *Attorney, Agent, or Firm* — Abbey A. Lopez

(57) ABSTRACT

A system for controlling the temperature in at least one room is provided. The system includes a central communication unit that is communicably connected with a memory configured to store at least one temperature set point. The system includes a volatile composition dispenser having a temperature sensor, wherein the temperature sensor is communicably connectable with the central communication through a wireless communication link. The system includes an air handling device communicably connectable with the central communication unit. The central communication unit compares incoming signals of temperature measurement from the temperature sensor with the temperature set point and sends outgoing instructions to the air handling device to heat or cool a room to the temperature set point if the temperature measurement is different from the temperature set point and to turn off if the temperature measurement is equal to the temperature set point.

18 Claims, 5 Drawing Sheets

(51) Int. Cl.
*H04M 1/725* (2006.01)
*H04W 4/70* (2018.01)
*F24F 11/30* (2018.01)
*F24F 110/10* (2018.01)

(58) Field of Classification Search
USPC ......................................................... 700/278
See application file for complete search history.

(56) References Cited

U.S. PATENT DOCUMENTS

| | | | |
|---|---|---|---|
| 6,267,297 | B1 | 7/2001 | Contadini et al. |
| 7,154,579 | B2 | 12/2006 | Selander et al. |
| 7,469,844 | B2 | 12/2008 | Conway et al. |
| 7,687,744 | B2 | 3/2010 | Walter et al. |
| 7,786,889 | B2 | 8/2010 | Van Der Poel et al. |
| 8,170,405 | B2 | 5/2012 | Harris |
| 8,249,731 | B2 | 8/2012 | Tran et al. |
| 8,620,841 | B1 | 12/2013 | Filson et al. |
| 8,727,611 | B2 | 5/2014 | Huppi et al. |
| 8,886,785 | B2 | 11/2014 | Apte et al. |
| 8,892,261 | B2 | 11/2014 | Hoonhout et al. |
| 8,955,765 | B2 | 2/2015 | Porchia et al. |
| 9,103,555 | B2 * | 8/2015 | Zou ..................... F24F 3/0442 |
| 9,113,052 | B1 | 8/2015 | Scalisi et al. |
| 9,115,908 | B2 | 8/2015 | Shetty et al. |
| 9,352,063 | B2 * | 5/2016 | Ooten .................... A61L 9/127 |
| 9,738,125 | B1 | 8/2017 | Brickley et al. |
| 9,804,578 | B2 | 10/2017 | Deilmann |
| 9,857,810 | B2 | 1/2018 | Smith, Jr. |
| 2003/0040813 | A1 | 2/2003 | Gonzales et al. |
| 2004/0163073 | A1 | 8/2004 | Krzyzanowski et al. |
| 2004/0265164 | A1 | 12/2004 | Woo et al. |
| 2006/0161270 | A1 | 7/2006 | Luskin et al. |
| 2007/0043478 | A1 | 2/2007 | Ehlers |
| 2007/0166575 | A1 | 7/2007 | McLeod |
| 2007/0228183 | A1 | 10/2007 | Kennedy |
| 2009/0177328 | A1 | 7/2009 | Finley |
| 2009/0271003 | A1 | 10/2009 | Van Houtert et al. |
| 2010/0196195 | A1 | 8/2010 | Moschel |
| 2011/0077758 | A1 | 3/2011 | Tran et al. |
| 2012/0251989 | A1 | 10/2012 | Wetmore et al. |
| 2013/0081541 | A1 | 4/2013 | Hasenoehrl et al. |
| 2013/0082817 | A1 | 4/2013 | Gruenbacher et al. |
| 2013/0190556 | A1 | 7/2013 | Wetmore et al. |
| 2014/0023060 | A1 | 1/2014 | Apte et al. |
| 2014/0067130 | A1 | 3/2014 | Pillai et al. |
| 2014/0188287 | A1 | 7/2014 | Sabata |
| 2014/0265920 | A1 | 9/2014 | Pederson |
| 2015/0019030 | A1 | 1/2015 | Chandler et al. |
| 2015/0030498 | A1 | 1/2015 | Ooten |
| 2015/0116110 | A1 | 4/2015 | Schuman |
| 2015/0297778 | A1 * | 10/2015 | Conroy .................. G06Q 10/08 239/11 |
| 2016/0040903 | A1 * | 2/2016 | Emmons ............. H04L 67/1078 700/278 |
| 2017/0336815 | A1 | 11/2017 | Smith, Jr. |

FOREIGN PATENT DOCUMENTS

| | | |
|---|---|---|
| JP | 2006246437 A | 9/2006 |
| JP | 2010096433 A | 4/2010 |
| JP | 2015031506 A | 2/2015 |
| WO | WO 2006/126139 A1 | 11/2006 |
| WO | WO 2010/058382 A1 | 5/2010 |
| WO | WO 2014/036133 A1 | 3/2014 |
| WO | WO 2014/040118 A1 | 3/2014 |
| WO | WO 2014/135990 A2 | 9/2014 |
| WO | WO2014201339 A1 | 12/2014 |

OTHER PUBLICATIONS

U.S. Appl. No. 14/879,112, filed Oct. 9, 2015, Hasenoehrl, et al.
PCTUS2016/055869; 14 Pages; Dated Dec. 21, 2016.
PCTUS2016/055480; 16 Pages; Dated Dec. 19, 2016.
PCTUS2016/055487; 13 Pages; Dated Dec. 13, 2016.
"Febreze Home & Connect (Webinar: Making IoT Accessible)", youtube, Mar. 17, 2016 (Mar. 17, 2016), p. 6 pp., XP054978005,Retrieved from the Internet:URL:https://www.youtube.com/watch?v=EWCw93kTtOQ [retrieved on Jan. 10, 2018].
PCT US2017/056240; 51 Pages; Dated Jan. 19, 2018.
R. Stapler et al: "Pura Scents: Smart Air 1,2,4-6, Freshener Meets Smart Nightlight by Team 10 Pura Scents—Kickstarter", ,Nov. 17, 2015 (Nov. 17, 2015) , XP055439290, Retrieved from the Internet: URL:https://www.kickstarter.com/projects/1253223575/pura-scents-the-worlds-smartestair-reshener/description[retrieved on Jan. 9, 2018].
R. Stapler et al: "Pura Scents: Smart Air Freshener Meets Smart Nightlight", Nov. 17, 2015 (Nov. 17, 2015), XP055439784,Retrieved from the Internet: URL:https://www.kickstarter.com/projects/1253223575/pura-scents-the-worlds-smartestair-freshener/faqs[retrieved on Jan. 10, 2018].
Bodhale, Asmita, and J. S. Kulkarni. "Arduino Based Vending Machine." International Journal of Engineering Technology, Management and Applied Sciences, May 2017, vol. 5, Issue 5, pp. 795-800.
Gehring, Sven, et al. "Mobile product customization." CHI'10 Extended Abstracts on Human Factors in Computing systems. ACM, 2010. pp. 3463-3468.

* cited by examiner

US 10,429,806 B2

VOLATILE COMPOSITION DISPENSER HAVING A TEMPERATURE SENSOR TO REMOTELY CONTROL AN AIR HANDLING DEVICE

FIELD

The present disclosure is directed to systems and methods of controlling the climate in a building using a volatile composition dispenser.

BACKGROUND

Air handling devices, such as heating, ventilation, and air conditioning (HVAC) devices, are often used in buildings, such as homes, businesses, and offices, to maintain the interior of the building at a desired temperature and humidity. Thermostats are often used to control an air handling device within a building. Thermostats may be programmable to control the air handling device differently at different times of day and/or days of the week. Thermostats may be wired to the air handling device. Thermostats are typically installed on a wall located in one room within a building, while the air handling device is meant to control the temperature of the entire building. The thermostat may include a temperature sensor configured to sense the temperature at the location of the thermostat. Even though the air handling device is configured to maintain the temperature within all of, or substantially all of, the building, various environmental factors can cause rooms to be at different temperatures. For example, different rooms may receive different amounts of sunlight and at different times of the day. Moreover, rooms that are positioned above or below garages, attics, or other spaces that are not connected with the air handling device may be hotter or colder than the room where the thermostat is located due to hot or cold air from hot or cold air radiating through the walls from an adjacent garage, attic, or uncontrolled space. Additionally, humidity may vary throughout a house due to factors like cooking and bathroom usage.

Thermostats can be relocated to a more desirable location. However, a conventional thermostat is fixed in one location and cannot be readily relocated. A user may have an interest in being able to change the room that the air handling device is controlled based upon.

Remote temperature sensors exist. However, remotely sensing the temperature in a house to control the climate in a building requires purchasing additional devices that a user would otherwise not need.

Therefore, there is a need for remote temperature and humidity control aside from a conventional thermostat. Moreover, there is a need for remote temperature and humidity control that minimizes the number of devices needed to operate air handling devices.

SUMMARY

Aspects of the present disclosure include a system for controlling the temperature in at least one room, the system comprising: a central communication unit capable of receiving incoming signals and sending outgoing instructions, the central communication unit communicably connected with a memory configured to store at least one temperature set point. The system comprises a volatile composition dispenser having a temperature sensor, wherein the temperature sensor is communicably connectable with the central communication through a wireless communication link, wherein the temperature sensor is configured to measure the temperature in a room and send temperature measurements in the form of incoming signals to the central communication unit. The system further comprises an air handling device communicably connectable with the central communication unit and configured to turn on or off upon receipt of an outgoing instruction from the central communication unit. The central communication unit compares the incoming signals of temperature measurement from the temperature sensor with the temperature set point and sends outgoing instructions to the air handling device to heat or cool a room to the temperature set point if the temperature measurement is different from the temperature set point and to turn off if the temperature measurement is equal to or substantially equal to the temperature set point.

Aspects of the present disclosure also include a method of controlling the temperature in at least one room with a volatile composition dispenser and an air handling device, the volatile composition dispenser having a temperature sensor, wherein the temperature sensor and the air handling device are each communicably connectable with a central communication unit, the central communication unit communicably connected with a memory capable of storing set points, the method comprising the steps of: (a) setting a temperature set point in the memory; (b) measuring the temperature in the at least one room with the temperature sensor on the volatile composition dispenser; (c) sending a temperature measurement to the central communication unit; (d) comparing the temperature measurement with the temperature set point; (e) sending an outgoing instruction to the air handling device to heat or cool the at least one room to the temperature set point if the temperature measurement is different than the temperature set point or to turn the air handling device off if the temperature measurement is equal or substantially equal to the temperature set point; and (f) optionally repeating steps (a) through (e).

Aspects of the present disclosure include a method of controlling the temperature in at least two rooms during different time periods with at least one volatile composition dispenser and an air handling device, wherein the temperature sensor and the air handling device are each communicably connectable with a central communication unit, wherein the central communication unit is communicably connected with a memory capable of storing set points, the method comprising the steps of: (a) storing a first temperature set point in the memory of the central communication unit, wherein the central communication unit is programmed to use the first temperature set point during a first time period; (b) storing a second temperature set point in the memory of the central communication unit, wherein the central communication unit is programmed to use the second temperature set point during a second time period that is different from the first time period; (c) measuring the temperature in a first room with a first temperature sensor of a volatile composition dispenser during the first time period; (d) sending the first temperature measurement to the central communication unit; (e) comparing the first temperature measurement with the first temperature set point with the central communication unit; (f) sending an outgoing instruction to the air handling device in the first time period to turn on if the first temperature measurement is different than the first temperature set point or to turn off if the first temperature measurement is the same as the first temperature set point; (g) measuring the temperature in a second room with a second temperature sensor during the second time period; (h) sending the second temperature measurement to the central communication unit; (i) comparing the second temperature measurement with the second temperature set point with the central communication unit; (j) sending an outgoing instruction to the air handling device in the set time period to turn on if the second temperature measurement is different than the second temperature set point or to turn off if the second temperature measurement is the same as the second temperature set point; and (k) optionally repeating any of steps (a) through (j).

DETAILED DESCRIPTION

While the methods and systems of the present disclosure will be described more fully it is to be understood at the outset of the description which follows that persons of skill in the appropriate arts may modify the methods and systems herein described while still achieving the favorable results of described in the present disclosure. Accordingly, the description which follows is to be understood as being a broad, teaching disclosure directed to persons of skill in the appropriate arts, and not as limiting upon the present disclosure.

The present disclosure includes systems and methods for indoor environment control utilizing one or more air handling devices, a central communication unit (CCU) that is communicably connectable with the air handling system, and one or more volatile composition dispensers that each include at least one sensor that is communicably connectable with the CCU. The sensors may include temperature sensors, humidity sensors, air quality sensors, and the like. The CCU comprises a memory that is capable of storing set points and algorithms and a processor that is capable of running algorithms and accessing the stored set points from the memory.

The sensor(s) on the volatile composition dispenser(s) is configured to send sensor measurements in the form of incoming signals to the CCU. In turn, the processor compares the incoming signals with set points stored in the memory. The processor will then send outgoing instructions to the air handling system if the incoming signal from the sensor is different than the set point.

The volatile composition dispenser may be moved to different rooms at the user's convenience. Moreover, by providing a volatile composition dispenser that includes one or more sensors, the user is able to use the volatile composition dispenser as a dual or multi-purpose device, thereby reducing the number of devices need to control the climate in a building.

Figure 1:
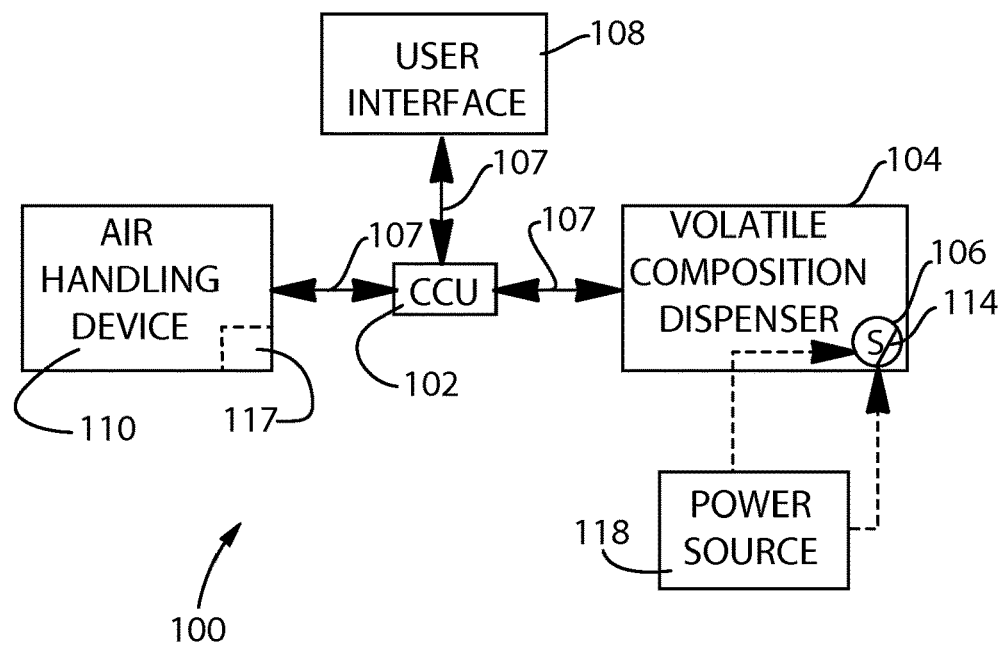
FIG. 1 illustrates a system having a central communication unit, an air handling device, a volatile composition dispenser, and optionally a user interface.

FIG. 1 illustrates exemplary components of the system 100, including the central communication unit 102, a volatile composition dispenser 104 having one or more sensors 106 that communicate with the CCU 102 through a wireless communication link 107, a user interface 108 for adjusting set points and viewing live or current sensor measurements, and an air handling device 110 that is controlled by the CCU 102 in order to manage the climate in a building.

Figure 2:
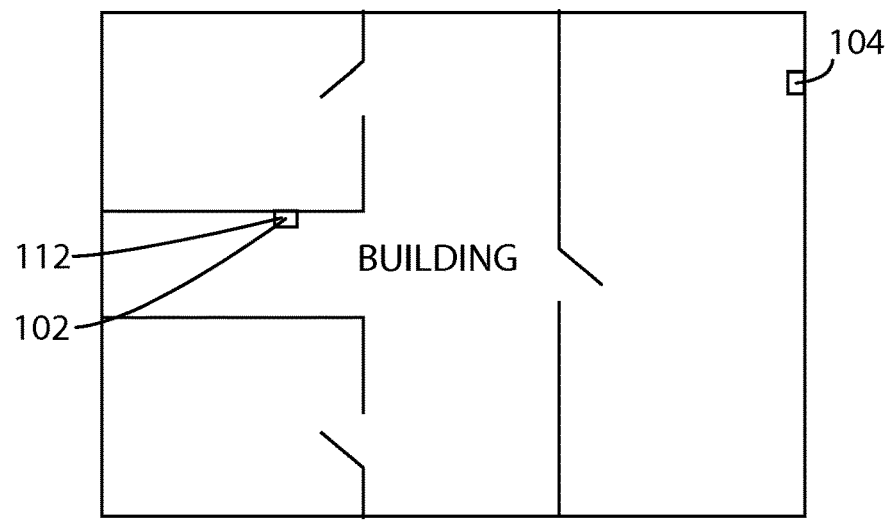
FIG. 2 illustrates the placement of a volatile composition dispenser in a different room from the placement of the CCU.

FIG. 2 illustrates the placement of the volatile composition dispenser 104 in a different room from the placement of the CCU 102, shown as a thermostat 112 for exemplary purposes only. As shown in FIG. 2, if a user desires the air handling device 110 to manage the climate in a building based upon the climate conditions in a room different from the location of the thermostat 112, the user can place the volatile composition dispenser 104 in any room of the building so that the sensor 106 can take readings from that room.

The rooms in a home or building may have various different functions and may be arranged in different configurations. The home may include one or more bedrooms, one or more bathrooms, a kitchen, hallway(s), living room, dining room, great room, and the like. The volatile composition dispenser 104 may be disposed in any room having any function. Moreover, the CCU 102 may be disposed in any room having any function.

Air Handling System

The system 100 may include an air handling device 110. Air handling devices 110 provide heating, ventilation, air condition (HVAC), humidity control, and/or air handling for an enclosure, such as a single-family home, apartment, office building, business, and the like. The air handling device 110 may be configured as a forced air type heating and cooling system. However, the air handling device 110 may be configured in various different ways. For example, the air handling device 110 may be configured in the form of a heat-pump based system; fan, including ceiling fan or portable fan; portable air conditioner; and/or portable heater.

The air handling device 110 may have one or more controls. The controls on the air handling device 110 may include turn ON/OFF the heater, turn ON/OFF the air conditioner, and/or turn ON/OFF the ventilation.

The air handling device 110 may include a wireless communication module 117 in order to be wirelessly connected with various components of the system 100, such as the CCU 102, the volatile composition dispenser 104, and/or the smart appliance, through a wireless communication link.

Volatile Composition Dispenser

A volatile composition dispenser 104 may be used for the delivery of a volatile composition to the atmosphere or onto an inanimate surface. Such volatile composition dispensers 104 may be configured in a variety of ways. The volatile composition dispenser may include a wireless communication module 114 in order to establish a wireless communication link with various components of the system 100. The volatile composition dispenser may additionally include mesh network border router functionality.

For example, the volatile composition dispenser 104 may be configured for use as an energized dispenser (i.e. powered by electricity; or chemical reactions, such as catalyst fuel systems; or solar powered; or the like). Exemplary energized volatile composition dispensers include a powered delivery assistance means which may include a heating element, a piezo element, thermal ink jet element, fan assembly, or the like. More particularly, the volatile composition dispenser may be an electrical wall-plug volatile composition dispenser, a non-limiting example of an electrical wall-plug volatile composition dispenser is described in U.S. Pat. No. 7,223,361; a battery (including rechargeable battery) powered volatile composition dispenser having a heating and/or fan element. In energized devices, the volatile material delivery engine may be placed next to the powered delivery assistance means to diffuse the volatile material. The volatile material may be formulated to optimally diffuse with the delivery assistance means.

The volatile composition dispenser 104 may be configured for use as a non-energized dispenser. An exemplary non-energized volatile composition dispenser includes a reservoir and, optionally, capillary, wicking means, or an emanating surface, to help volatile materials passively diffuse into the air (i.e. without an energized means). A more specific example a volatile composition dispenser includes a delivery engine having a liquid reservoir for containing a volatile material and a microporous membrane enclosing the liquid reservoir as disclosed in U.S. Pat. Nos. 8,709,337 and 8,931,711.

The volatile composition dispenser 104 may also be configured for use as an aerosol sprayer or a non-aerosol air sprayer. The volatile composition dispenser 104 can be programmed to automatically deliver a volatile composition to the atmosphere.

The volatile composition dispenser 104 may be configured in the form of an air purifying system to deliver both purified air and/or volatile materials to the atmosphere. Non-limiting examples include air purifying systems using ionization and/or filtration technology for use in small spaces (e.g. bedrooms, bathrooms, automobiles, etc.), and whole house central air conditioning/heating systems (e.g. HVAC).

The volatile composition dispenser 104 may be movable to different rooms within a housing or building. Moreover, a house or building may include one or more volatile composition dispensers that are positioned in the same room or in different rooms.

Volatile Composition

The volatile composition may be an air freshening composition, including a perfume composition and/or a malodor control composition. The volatile composition may be an insect repellant.

The volatile composition may comprise volatile materials. Exemplary volatile materials include perfume materials, volatile dyes, materials that function as insecticides, essential oils or materials that acts to condition, modify, or otherwise modify the environment (e.g. to assist with sleep, wake, respiratory health, and like conditions), deodorants or malodor control compositions (e.g. odor neutralizing materials such as reactive aldehydes (as disclosed in U.S. 2005/0124512), odor blocking materials, odor masking materials, or sensory modifying materials such as ionones (also disclosed in U.S. 2005/0124512)).

The volatile composition may include perfume ingredients to provide a desirable scent in the air. The volatile composition includes a mixture of volatile aldehydes that are designed to deliver genuine malodor neutralization (and not function merely by covering up or masking odors). A genuine malodor neutralization provides a sensory and analytically measurable (e.g. gas chromatograph) malodor reduction. Thus, if the volatile composition delivers genuine malodor neutralization, the volatile composition will reduce malodors in the vapor and/or liquid phase. The volatile composition may comprise a mixture of volatile aldehydes that neutralize malodors in vapor and/or liquid phase via chemical reactions. Such volatile aldehydes are also called reactive aldehydes. Volatile aldehydes may react with amine-based odors, following the path of Schiff-base formation. Volatiles aldehydes may also react with sulfur-based odors, forming thiol acetals, hemi thiolacetals, and thiol esters in vapor and/or liquid phase.

The volatile composition may include various other ingredients, including, but not limited to: surfactants; acid catalysts; polymers; buffering agents; solubilizers; antimicrobial compounds; preservatives; wetting agents; aqueous carrier; diluents; the like; and combinations thereof.

Sensors

The volatile composition dispenser includes one or more sensors 106. The sensors 106 may be configured to sense temperature, relative humidity, air quality, $CO_2$ levels, air particle counters, and allergens and other air borne entities that have effect on human health. The sensor 106 may include a wireless communication module in order to be communicably connected with the CCU through a wireless communication link.

The sensor 106 may be powered by a power source 118. The sensor 106 may be powered independently from the volatile composition dispenser 104 or through the same power source of the volatile composition dispenser 104. The sensor 106 may be powered by a battery independently from the volatile composition dispenser 104 or by a battery configured to also power the volatile composition dispenser 104. The volatile composition dispenser and/or the sensor 106 may be powered through an electrical outlet. Battery power may be used when the volatile composition dispenser is a mobile device that can be moved around from room to room or surface to surface. Moreover, a battery may be used to power the sensor 106 when the volatile composition dispenser is configured as a non-energized device that passively diffuses volatile compositions into the air.

The sensor is configured to send sensor measurements to the CCU in the form of incoming signals. The sensor measurements can be used in a variety of ways. For example, the sensor measurements may be viewed as live data; compared with set points, such as temperature set points in order to control the air handling device; or stored in a database for further analysis to recommend optimum set points taking comfort and energy efficiency into consideration.

Figure 3:
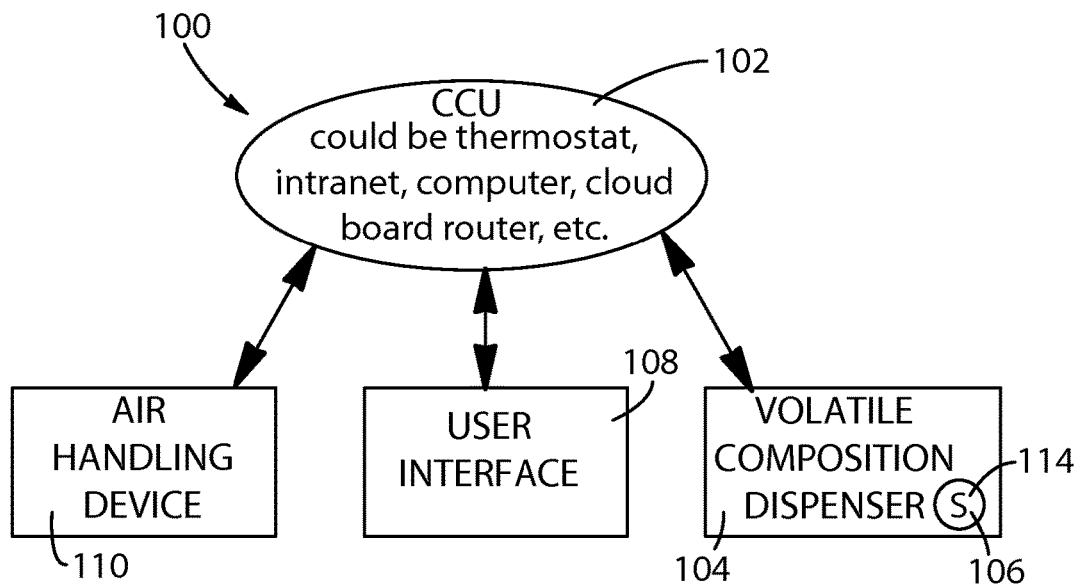
FIG. 3 illustrates multiple possible flows of sensor measurements to either view sensor measurements live or store for analysis.

FIG. 3 depicts multiple possible flows of sensor measurements to either view the sensor measurements live or store for analysis. The sensor measurements can flow through the CCU to a user interface for live local sensor measurements. Alternatively, the sensor measurements can also pass from the sensor through the CCU to a destination server on the internet where it is stored in memory or analyzed by a processor.

Central Communications Unit

The CCU 102 can be configured in various different ways. The CCU 102 may be configured to receive sensor measurements in the form of incoming signals from the sensor(s) 106 and send outgoing instructions to one or more components of the system 100, for example the air handling device and/or the volatile composition dispenser. The CCU 102 may be communicably connectable with various components of the system 100, including the sensor(s) 106, user interface(s) 108, and/or smart appliances using a wireless communication module 116. Various wireless communication links may be used, including 802.11 (Wi-Fi), 802.15.4 (ZigBee, 6LoWPAN, Thread, JennetIP), Bluetooth, combinations thereof, and the like. Connection may be through an ad hoc Mesh Network protocol.

Figure 4:
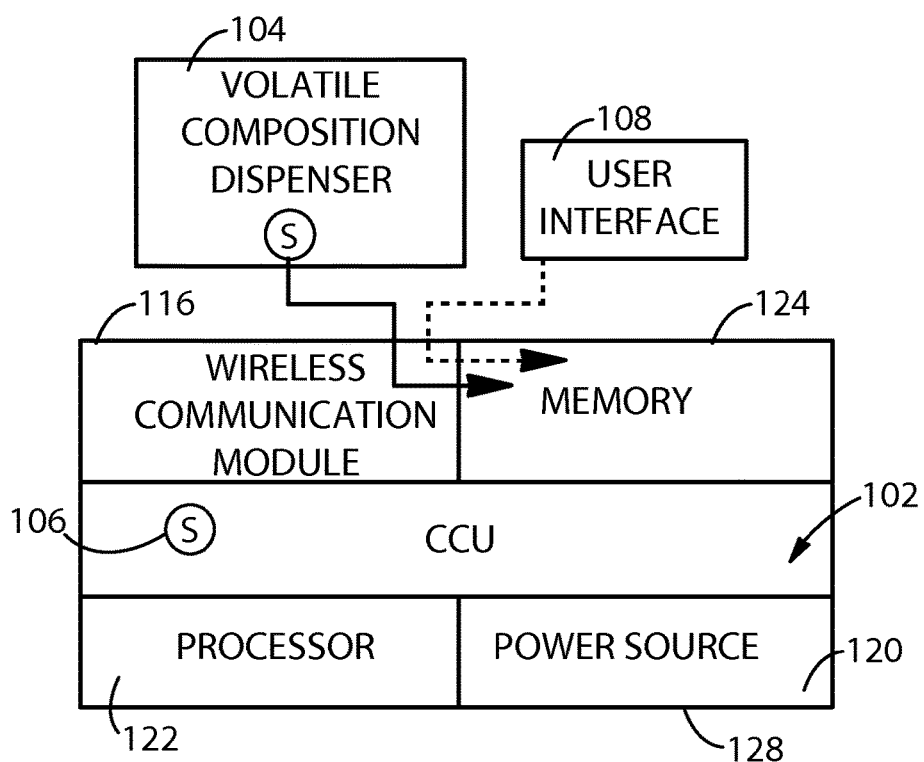
FIG. 4 illustrates an exemplary CCU having a processor and memory disposed within a housing.

With reference to FIG. 4, the CCU 102 may include a wireless communication module 116 in order to wirelessly connect the CCU 102 with various components of the system. Any module known in the art for establishing the wireless communication links 107 can be utilized.

The CCU 102 may comprise a processor 122. The processor 122 may be configured and programmed to carry out and/or cause to be carried out the one or more advantageous functionalities of the system 100 described herein. The processor 122 may be physically disposed within a CCU 102 or may be remotely located on a computer, special computer, smart device such as a phone or tablet, server, intranet, border router, cloud-based system, the like, or combinations thereof. The processor 122 can carry out algorithms stored in local memory; special-purpose processors or application-specific integrated circuits; algorithms carried out or governed remotely by central servers, or cloud-based systems, such as by virtue of running a Java virtual machine that executes instructions provided from a cloud server using Asynchronous JavaScript and XML or similar protocols.

The CCU 102 may comprise a memory 124. The memory may be configured to store set points, incoming signals such as sensor measurements, and/or algorithms. The memory may be a local memory within the CCU 102 such as a flash drive, hard drive, read only memory, or random access memory. Or, the memory may be configured as remote memory on a computer, smart device such as a phone or tablet, on a server, or on cloud-based system. The memory 124 can be accessible to the processor 122 in a variety of ways.

The processor and/or the memory of the CCU 102 may be disposed within a housing of the CCU 102. The CCU 102 may be connected with or separate from various components of the system 100. For example, the CCU 102 may be physically connected with the air handling device 110 or the volatile composition dispenser 104. The CCU 102 may be permanently positioned in a building in a separate room or location from other components such as the air handling device 110, the volatile composition dispenser 104, and/or a smart appliance, for example.

With reference to FIG. 4, the CCU 102 may also include a sensor 106. The CCU may be configured to receive incoming signals of sensor measurements from both the volatile composition dispenser 104 and/or directly from the CCU 102.

The CCU may include a clock or may be communicably connectable with a clock on a computer, smart device, or on the internet.

FIG. 4 illustrates an exemplary CCU 102 having the processor 122 and the memory 124 disposed within a housing 128. The CCU 102 shown in FIG. 4 may be disposed on or within a volatile composition dispenser 104, an air handling device 110, and/or a smart appliance. While FIG. 4 illustrates a processor 122 and a memory 124 disposed within the housing 128, it is to be appreciated that the processor 122 and/or the memory 124 may be remotely located relative to the CCU 102.

The CCU 102 may be communicably connected with the air handling device 110 in various ways. For example, the CCU 102 may be electrically wired to the air handling device 110. The CCU 102 may be communicably connectable with the air handling device through a wireless connection link.

Incoming signals, such as from the sensor 106, may be directly sent from the sensor 106 to a computer or smart device through a wireless connection link. Or, the incoming signals may pass through a CCU unit comprising a transmitter 126 that transmits the incoming signals to the remote memory 124.

Figure 5:
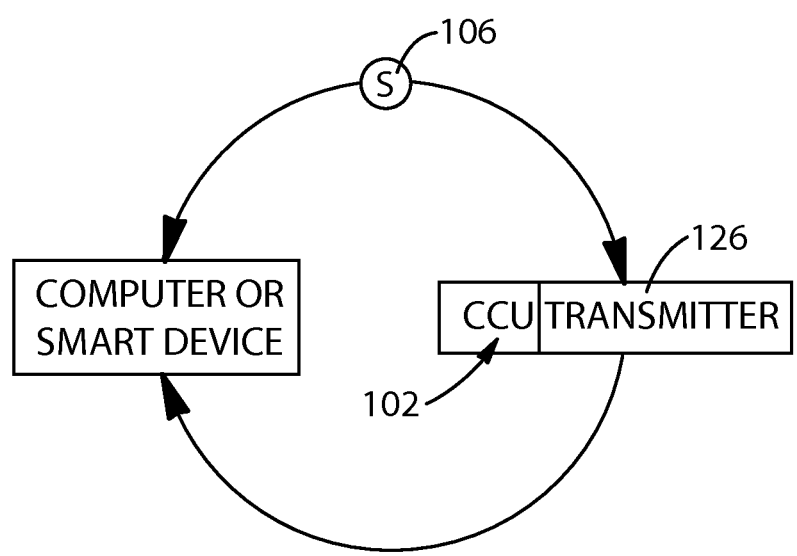
FIG. 5 illustrates two exemplary flows of sensor measurements to a remote memory.

FIG. 5 illustrates two exemplary flows of sensor measurements to a remote memory. The sensor measurements may flow directly to a computer or smart device through a wireless communication link or through a transmitter of the CCU to a remote memory. The processor 122 may access the sensor measurements from the memory 124. The processor 122 may access the memory 124 through a wired or wireless communication link.

The processor 122 may be configured to compare incoming signals from a sensor 106 to set points stored in the memory 124. The processor is able to retrieve stored set points from the memory 124 to compare.

A user may select a desired algorithm for the CCU 102 to execute. For example, a user may select from the following algorithms, which are given the following titles for exemplary purposes only: COOL, HEAT, or AUTO. In the COOL algorithm, the CCU will turn on the air conditioner of the temperature sensor measurement is above the temperature set point, but will not turn on the heater if the temperature sensor measurement is below the temperature set point. In the HEAT algorithm, the CCU will turn on the heater if the temperature sensor measurement is below the temperature set point, but will not turn on the air conditioning if the temperature sensor measurement is above the temperature set point. In the AUTO algorithm, the CCU will turn the air conditioner on if the temperature sensor measurement is above the temperature set point and will turn on the heater if the temperature sensor measurement is below the temperature set point.

Figure 6:
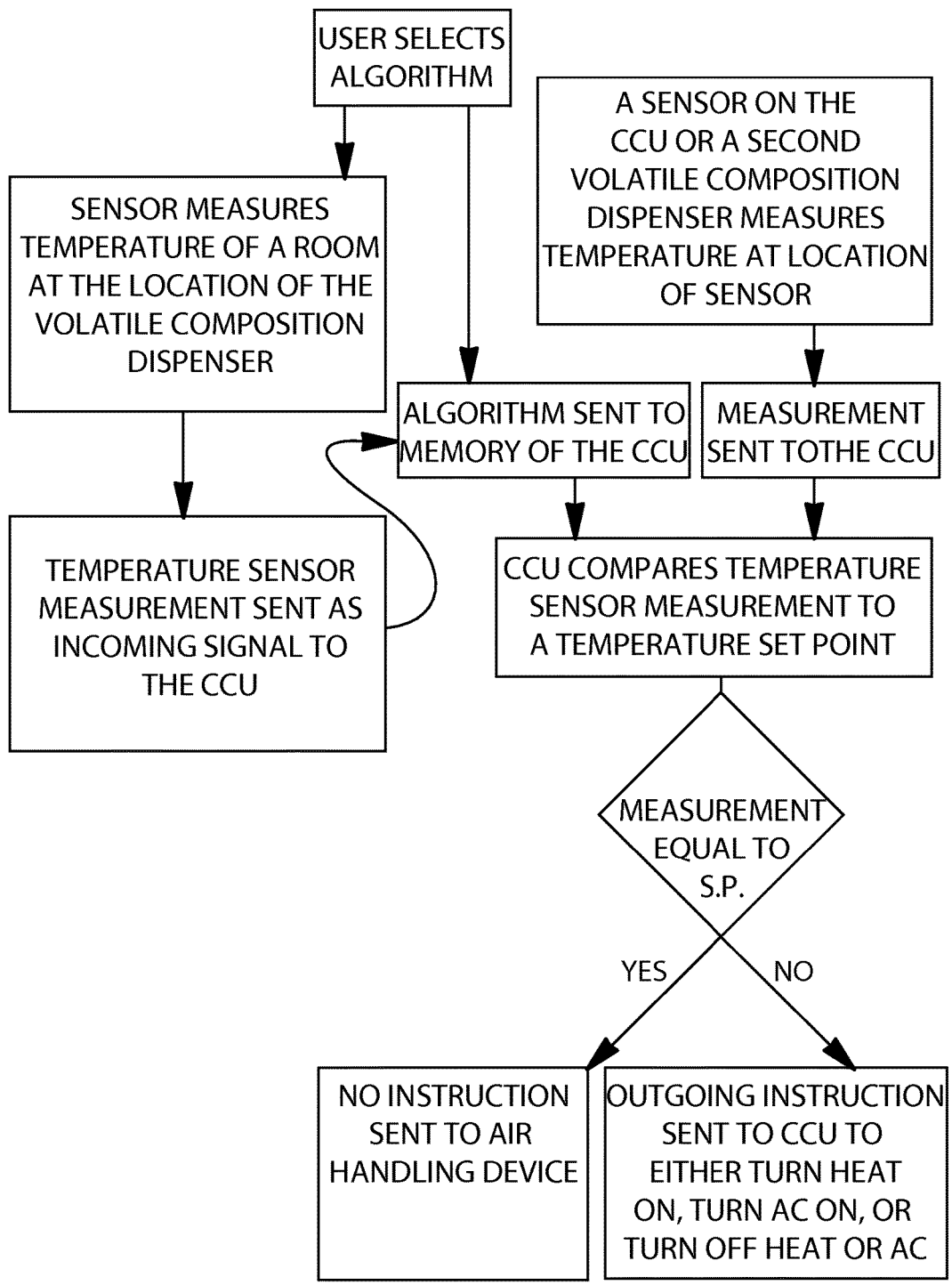
FIG. 6 illustrates two exemplary flows of sensor measurements for controlling an air handling device with a sensor on a volatile composition dispenser or on a CCU.

FIG. 6 illustrates an exemplary method for controlling the temperature in at least one room. The temperature sensor measurement may be taken from a sensor 106 on the volatile composition dispenser 104 or may also be taken from a sensor on the CCU or on a second volatile composition dispenser.

With continuing reference to FIG. 6, in an exemplary algorithm, the processor 122 may be configured to compare incoming signals from a temperature sensor measurement on the volatile composition dispenser 104 to temperature set points that are stored in the memory 124. If the temperature measurement sent in the form of an incoming signal to the CCU 102 is different from the temperature set point stored in memory 124, the processor 122 sends an outgoing instruction to the air handling device 110 to either turn ON the heater if the temperature sensor measurement is below the temperature set point or turn ON the air conditioner if the temperature sensor measurement is above the temperature set point. If the temperature sensor measurement is equal to or substantially equal to the temperature set point, the processor 122 either sends an outgoing instruction to the air handling device 110 to turn OFF if the air handling device 110 is currently ON or does not send an outgoing instruction to the air handling device 110 if the air handling device 110 is currently OFF. As a result of using the temperature sensor measurement from the volatile composition dispenser 104, the user is able to select any room in the house to control the temperature from simply placing the volatile composition dispenser 104 in a particular room instead of having to permanently relocate the thermostat. Moreover, the volatile composition dispenser 104 serves multiple purposes, thereby eliminating the need for a volatile composition dispenser and a separate remote temperature sensor unit.

"Substantially equal to" may include an acceptable tolerance between the temperature set point and the temperature sensor measurement that may be programmed into an algorithm. As such, temperature sensor measurements that are substantially equal to the temperature set point may be treated as being equal to the temperature set point by the processor.

The memory 124 may be configured to store multiple set points. For example, there may be different set points for different times, time periods of a day and there may be different set points for different days of the week. The processor may include a clock in determine which set point is to be used for a particular time of day and/or day of the week.

The processor may be configured to use sensor measurements from different sensors located within a house or building at different times of the day and/or different days of the week. For example, a first volatile composition dispenser may be located in a first room of a house and a second volatile composition dispenser may be located in a second room of the house that is separate from the first room. The CCU may be programmed to utilize the sensor(s) of the first volatile composition dispenser at a first time period and/or on a first day and the CCU may be programmed to utilize the sensor(s) of the second volatile composition dispenser at a second time period and/or on a second day that is different from the first time period and/or first day. As a result, the system can control the temperature in particular room in the house based on the room a user will occupy during a particular time of day without the user having to move a single volatile composition dispenser through the house at different times of the day.

The CCU may be configured as a thermostat such as the thermostat shown in FIG. 2. Power for the thermostat may be scavenged from the control wires that connect the air handling device to the thermostat. The thermostat may include a processor or memory, or the thermostat may communicate with a remote processor and/or memory. The thermostat may include a user interface.

The thermostat may be a NEST® learning thermostat, a LUTRON® thermostat etc.

The processor may compute optimal set points from an algorithm based on user preferences of volatile composition levels and air handling device operation profiles based on historical sensor measurements, historical set points, and known information on energy efficiency, comfort, and volatile composition levels. A machine learning algorithm can learn a user(s) preferred set points at various times of day and/or days of the week and/or can be used to program a more energy efficient algorithm, for example. An exemplary learning system is used in a NEST® learning thermostat. An exemplary learning system is also described in U.S. Pat. No. 9,115,908. The processor then transmits the optimal set points to the memory which then stores the set points for control of the HVAC.

Devices, including the air handling device, volatile composition dispenser, and/or smart appliance(s), of the system may interact with each other through the CCU such that events detected by one device may influence actions of another device or the current status of one device may influence actions of another device.

User Interface

The systems and methods of the present disclosure may include one or more user interfaces 108. The user interface 108 may be configured in various different forms. A user can interact with the user interface 108 to adjust set points as well as connect the sensors 106 through the CCU 102 for viewing of live sensor data on the user interface. The CCU 102 could also connect to the internet or intranet and pass through information, such as sensor measurements and the set points to a server for the purpose of remote monitoring on a user interface 108.

Figure 7:
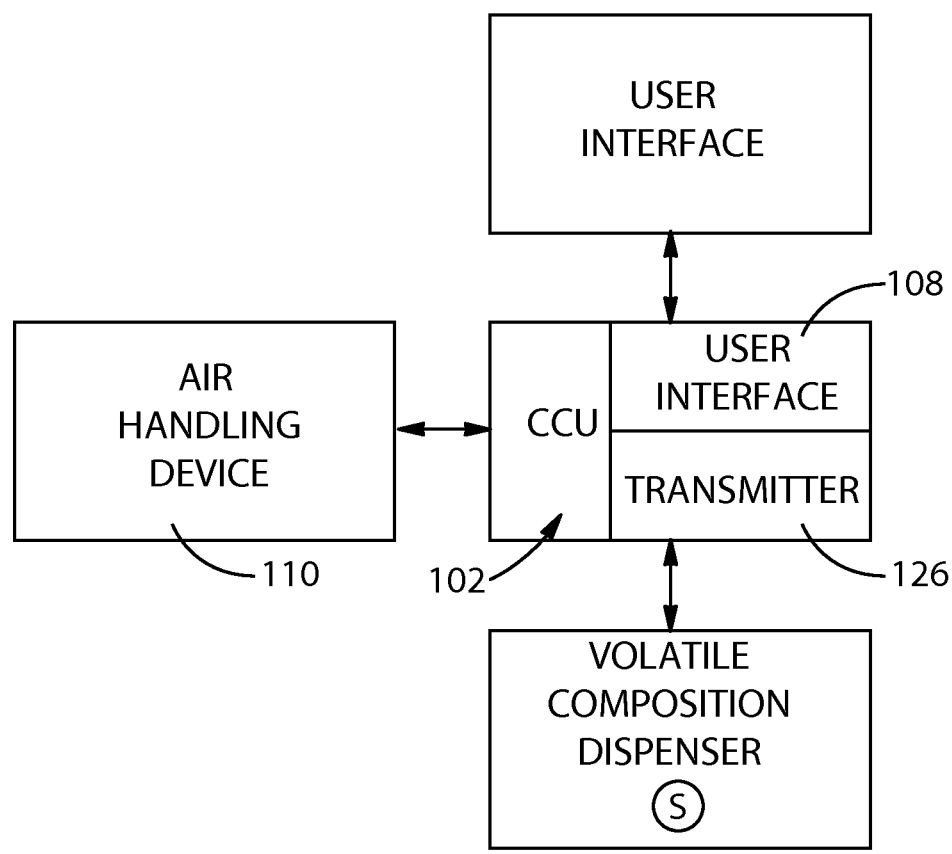
FIG. 7 illustrates an exemplary system having more than one user interface.

FIG. 7 illustrates an exemplary system having more than one user interface. In FIG. 7, a first user interface is connected with the CCU and a second user interface is a remote user interface. The remote user interface may be in the form of a computer or handheld smart device.

Where the CCU is configured as a thermostat, the thermostat may include a user interface where the user can adjust temperature set points by pushing buttons or turning dials, for example.

The user interface may be configured as a program, an HTML website, or Native application that is accessible by a user through a computer or handheld smart device. A handheld smart device may include an iPhone®, iPad®, or an Android® or Microsoft® based system. The user interface may be accessible on a computer such as a desktop, laptop, or tablet.

The system of the present disclosure may include a handheld smart device or computer that comprises the CCU 102, including the processor 122, memory 124, and/or user interface 108.

Smart Appliances

Various different smart appliances may also be connected with the system and included in the methods of the present disclosure. The smart appliances may be communicably connectable with the CCU. Smart appliances may include refrigerators, washers, dryers, dishwashers, microwaves, stoves, stereos, televisions, cable or satellite boxes, baby monitors, vacuum cleaners, security systems, lights, garage door openers, doorbell, indoor or outdoor sprinklers or irrigation systems, and the like.

The smart appliances may be configured to send an alert in the form of an incoming signal to the CCU, alerting the CCU that a particular smart appliance has been turned on or off. The smart appliance may also include sensors that are configured to send incoming signals to the CCU that alert the CCU as to current status of the smart appliance.

The CCU may also be configured initiate an algorithm that may include controlling a smart appliance based on sensor measurements sent to the CCU. The CCU may also be configured to control the volatile composition dispenser based upon the current status of a smart appliance.

Exemplary systems and methods that include coupling the operation of an air handling device with the operation of a volatile composition dispenser are described in U.S. patent application 14/879,110, entitled "SYSTEMS AND METHODS FOR COUPLING THE OPERATIONS OF AN AIR HANDLING DEVICE AND A VOLATILE COMPOSITION DISPENSER", filed on Oct. 9, 2015. Exemplary systems and methods that include coupling the operation of a smart appliance with the operation of a volatile composition dispenser are described in U.S. patent application 14/879,112, entitled "SYSTEMS AND METHODS FOR COUPLING THE OPERATIONS OF A VOLATILE COMPOSITION DISPENSER AND A SMART APPLIANCE", filed on Oct. 9, 2015.

Values disclosed herein as ends of ranges are not to be understood as being strictly limited to the exact numerical values recited. Instead, unless otherwise specified, each numerical range is intended to mean both the recited values, any integers within the specified range, and any ranges with the specified range. For example a range disclosed as "1 to 10" is intended to mean "1, 2, 3, 4, 5, 6, 7, 8, 9, and 10." It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Values disclosed herein as ends of ranges are not to be understood as being strictly limited to the exact numerical values recited. Instead, unless otherwise specified, each numerical range is intended to mean both the recited values, any integers within the specified range, and any ranges with the specified range. For example a range disclosed as "1 to 10" is intended to mean "1, 2, 3, 4, 5, 6, 7, 8, 9, and 10."

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system for controlling the temperature in at least one room, the system comprising:
   a central communication unit capable of receiving incoming signals and sending outgoing instructions, the central communication unit communicably connected with a memory configured to store at least one temperature set point;
   a volatile composition dispenser having a temperature sensor, wherein the volatile composition dispenser comprises a volatile composition, wherein the temperature sensor is communicably connectable with the central communication through a wireless communication link, wherein the temperature sensor is configured to measure the temperature in a room and send temperature measurements in the form of incoming signals to the central communication unit; and
   an air handling device communicably connectable with the central communication unit and configured to turn on or off upon receipt of an outgoing instruction from the central communication unit,
   wherein the central communication unit compares the incoming signals of temperature measurement from the temperature sensor on the volatile composition dispenser with the temperature set point and sends outgoing instructions to the air handling device to heat or cool a room to the temperature set point if the temperature measurement from the temperature sensor on the volatile composition dispenser is different from the temperature set point and to turn off if the temperature measurement is equal to or substantially equal to the temperature set point,
   wherein the volatile composition dispenser is movable throughout the at least one room or movable into a different room.

2. The system of claim 1, wherein the central communication unit is located in a different room from the volatile composition dispenser.

3. The system of claim 1, wherein the wireless communication link is selected from the group consisting of: Wi-Fi; Bluetooth; ZigBee, 6LoWPAN, Thread, Mesh Network, or combinations thereof.

4. The system of claim 1, wherein the volatile composition dispenser is configured with mesh network border router functionality.

5. The system of claim 4, wherein the central communication unit is communicably connectable with a computer or smart device comprising a user interface, wherein the temperature set point is adjustable through the user interface.

6. The system of claim 1, wherein at least two volatile composition dispensers are communicably connectable with the central communication unit, a first volatile composition dispenser comprising a first temperature sensor and a second volatile composition dispenser comprising a second temperature sensor.

7. The system of claim 6, wherein the memory stores a first temperature algorithm for a first time period and a second temperature algorithm for a second time period, wherein the central communication unit uses temperature measurements from the first temperature sensor during the first time period and the central communication unit uses the temperature measurements from the second temperature sensor during the second time period, wherein the first and second time periods are different.

8. A method of controlling the temperature in at least one room with a volatile composition dispenser and an air handling device, the volatile composition dispenser having a temperature sensor, wherein the temperature sensor and the air handling device are each communicably connectable with a central communication unit, the central communication unit communicably connected with a memory capable of storing set points, wherein the volatile composition dispenser comprises a volatile composition, wherein the volatile composition dispenser is movable throughout the at least one room or movable into a different room, the method comprising the steps of:
   (a) setting a temperature set point in the memory;
   (b) measuring the temperature in the at least one room with the temperature sensor on the volatile composition dispenser;
   (c) sending a temperature measurement to the central communication unit;
   (d) comparing the temperature measurement with the temperature set point;
   (e) sending an outgoing instruction to the air handling device to heat or cool the at least one room to the temperature set point if the temperature measurement from the temperature sensor on the volatile composition dispenser is different than the temperature set point or to turn the air handling device off if the temperature measurement is equal or substantially equal to the temperature set point; and (f) optionally repeating steps (a) through (e).

9. The method of claim 8 further comprising the step of positioning the volatile composition dispenser in a different room than the central communication unit.

10. The method of claim 8, wherein the volatile composition dispenser is communicably connectable with central communication unit through a wireless communication link.

11. The method of claim 8, wherein the central communication unit communicably connectable with a computer or smart device.

12. The method of claim 8, wherein the memory is stored on the central communication unit or on a cloud-based system.

13. A method of controlling the temperature in at least two rooms during different time periods with at least one volatile composition dispenser and an air handling device, wherein the temperature sensor and the air handling device are each communicably connectable with a central communication unit, wherein the central communication unit is communicably connected with a memory capable of storing set points, wherein the volatile composition dispenser comprises a volatile composition, wherein the volatile composition dispenser is movable throughout the at least one room or movable into a different room, the method comprising the steps of:

(a) storing a first temperature set point in the memory of the central communication unit, wherein the central communication unit is programmed to use the first temperature set point during a first time period;

(b) storing a second temperature set point in the memory of the central communication unit, wherein the central communication unit is programmed to use the second temperature set point during a second time period that is different from the first time period;

(c) measuring the temperature in a first room with a first temperature sensor of a volatile composition dispenser during the first time period;

(d) sending the first temperature measurement to the central communication unit;

(e) comparing the first temperature measurement with the first temperature set point with the central communication unit;

(f) sending an outgoing instruction to the air handling device in the first time period to turn on if the first temperature measurement is different than the first temperature set point or to turn off if the first temperature measurement is the same as the first temperature set point;

(g) measuring the temperature in a second room with a second temperature sensor during the second time period;

(h) sending the second temperature measurement to the central communication unit;

(i) comparing the second temperature measurement with the second temperature set point with the central communication unit;

(j) sending an outgoing instruction to the air handling device in the set time period to turn on if the second temperature measurement is different than the second temperature set point or to turn off if the second temperature measurement is the same as the second temperature set point; and (k) optionally repeating any of steps (a) through (j).

14. The method of claim 13, wherein the central communication unit comprises the second temperature sensor.

15. The method of claim 13, wherein a second volatile composition dispenser comprises the second temperature sensor.

16. The method of claim 13, wherein the first time period is during the day and the second time period is at night.

17. The method of claim 13, wherein a user can adjust the first and second temperature set points using a computer or smart device.

18. The method of claim 13, wherein the temperature sensors are communicably connectable with the central communication unit through a wireless communication link.

* * * * *